United States Patent

Yamagishi

[11] 4,073,573
[45] Feb. 14, 1978

[54] ZOOM LENS SYSTEM
[75] Inventor: Akira Yamagishi, Omiya, Japan
[73] Assignee: Fuji Photo Optical Co., Ltd., Omiya, Japan
[21] Appl. No.: 745,606
[22] Filed: Nov. 29, 1976
[30] Foreign Application Priority Data
  Nov. 27, 1975  Japan .................. 50-142119
[51] Int. Cl.$^2$ ............................. G02B 15/18
[52] U.S. Cl. ..................... 350/187; 350/255
[58] Field of Search ............... 350/187, 255
[56] References Cited
U.S. PATENT DOCUMENTS

| 3,283,231 | 11/1966 | Askew ................. 350/187 X |
| 3,891,310 | 6/1975 | Hideo et al. ............ 350/187 |
| 4,008,951 | 2/1977 | Himmelsbach .......... 350/187 |

Primary Examiner—Paul A. Sacher
Attorney, Agent, or Firm—Harold L. Stults; Pasquale A. Razzano

[57] ABSTRACT

In a zoom lens system in which all or some of the lens components excluding the front fixed lens component are axially moved for taking a close-up photograph, a focusing lens group is axially moved in response to movement of a zooming lens group to maintain the resultant image position always in a stationary image plane. The interconnection between the focusing lens and the zooming lens is made through a mechanical or electrical control means which controls the movement of the focusing lens with reference to the movement of the zooming lens in accordance with a predetermined relationship therebetween.

5 Claims, 7 Drawing Figures

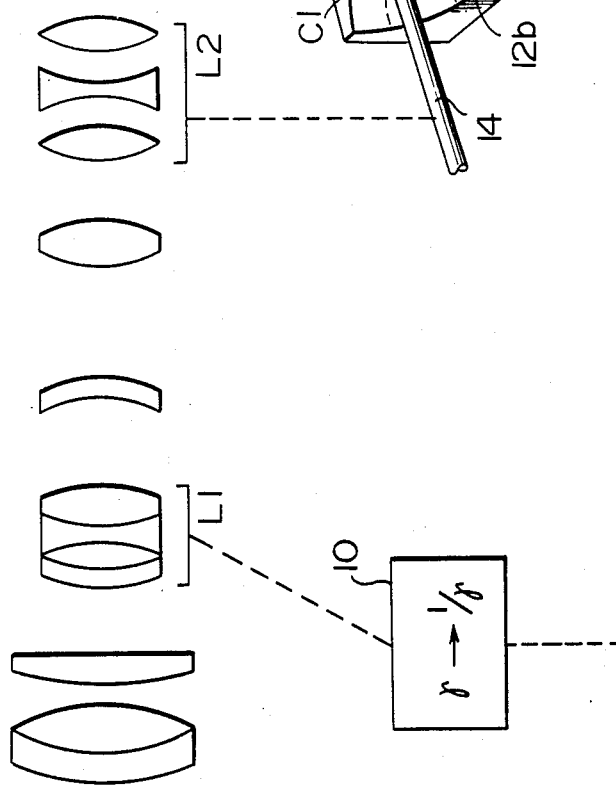
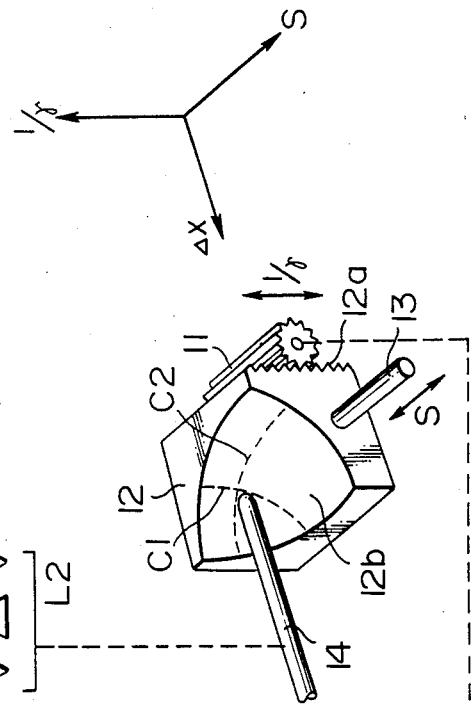

ZOOM LENS SYSTEM

BACKGROUND OF THE INVENTION

1. Field of the Invention

This invention relates to a zoom lens system, and more particularly to an improved zoom lens system wherein the focal length thereof is varied while maintaining the resultant image position always in the stationary image plane throughout the range.

2. Description of the Prior Art

There are known two types of zoom lens system. The zoom lens system is comprised of, for instance, as shown in FIG. 1, a front fixed lens component I, a zooming movable lens component II, a compensating movable lens component III, and relay fixed lens components IV and V. In one type of the zoom lens system, the front fixed lens component I is moved axially when taking a close-up photograph. In the other type, all the other four components or some of the other four components are axially moved when taking a close-up photograph. In the former type of the zoom lens system, the focus is maintained at a constant position. However, when taking a photograph of an object extremely close to the lens system, the front fixed lens component should be moved by an extraordinarily long distance and consequently light passing through the lens system does not reach the marginal portion of the film on the image plane in the camera. On the other hand, in the latter type of the zoom lens system which is called "macro-focus type zoom lens", it is easy to take a photograph of an object located extremely close to the lens system. However, the resultant image position is changed as the focal length thereof is changed in this type.

SUMMARY OF THE INVENTION

In view of the defects inherent in the conventional zoom lens system as described above, the primary object of the present invention is to provide a zoom lens system in which the resultant image position focused thereby is maintained in a stationary image plane in a microfocus type zoom lens.

Another object of the present invention is to provide a zoom lens system capable of taking a close-up photograph with a front lens component of comparatively small diameter.

Still another object of the present invention is to provide a zoom lens system in which adjustment of a focusing lens group is automatically made in response to axial movement of a zooming lens group so as to maintain the resultant image position in a stationary image plane.

The above objects of the present invention are accomplished by providing means for controlling the movement of a focusing lens group in accordance with the movement of a zooming lens group. In one embodiment of the present invention, the means for controlling the movement of the focusing lens group employs a mechanical control member such as a cam which controls the movement of the focusing lens group with reference to the movement of the zooming lens group. In another embodiment of the present invention, the means for controlling the movement of the focusing lens group employs an electric control means such as a combination of a control circuit and a servomotor which controls the movement of the focusing lens group with reference to the movement of the zooming lens group. In the embodiment employing the electrical control means, the movement of the lens group is converted to electric signals.

BRIEF DESCRIPTION OF THE DRAWING

FIG. 5A is a schematic view showing the zoom lens system in accordance with the present invention, FIG. 5B shows a three dimensional coordinate system employed in a control cam employed in the embodiment of the invention as shown in FIG. 5A.

DESCRIPTION OF THE PREFERRED EMBODIMENTS

Figure 1:
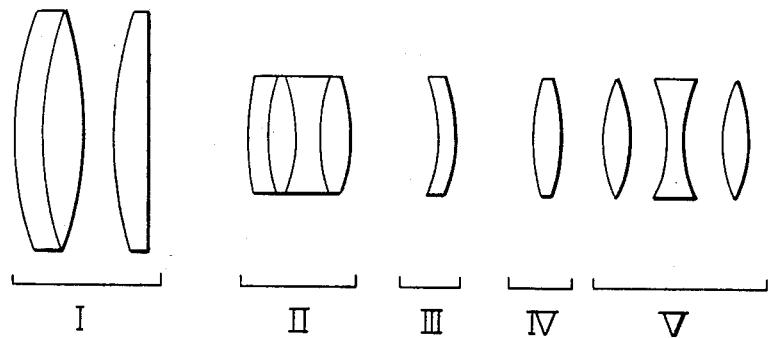
FIG. 1 is a schematic view showing a zoom lens system to which the present invention is applicable.
Figure 2:
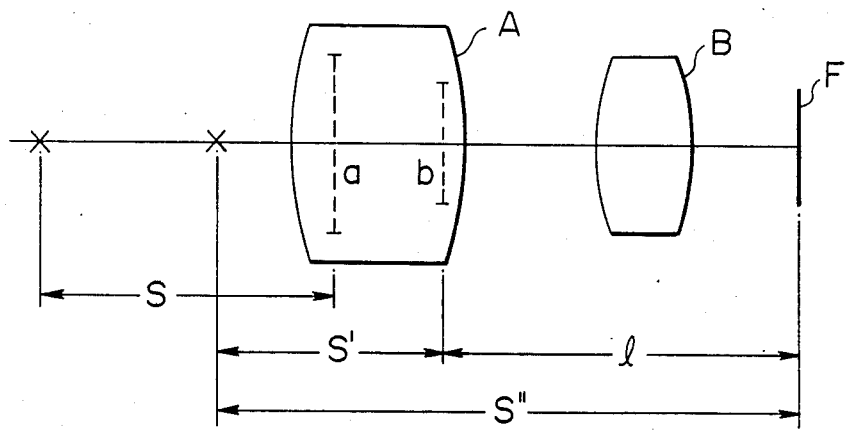
FIG. 2 is an optical diagram of a zoom lens system for explaining the principle of the present invention.

In the zoom lens system in accordance with the present invention is employed, for instance, a lens system as illustrated in FIG. 1. In the present invention, all or a part of the lens components excluding the front fixed lens component is moved for focusing and zooming operations. FIG. 2 shows in simplified illustration a zooming lens group A and a focusing lens group B to facilitate the understanding of the principle of the present invention. There are parallel light rays between the zooming lens group A and the focusing lens group B. In order to focus an image formed by the zoom lens system, the focusing lens group B is axially moved.

When an object is located at a distance S from the entrance pupil $a$ of the zoom lens group A and the image of the object is formed at a position at a distance $S'$ from the exit pupil $b$ of the zoom lens group A (The distance $S'$ is determined to be positive when taken on the right side in FIG. 2.), the relationship between the two distances S and $S'$ and the afocal magnification $\gamma$ of the zoom lens system is represented by the following formula.

$$S' = -S/\gamma^2 \qquad (1)$$

Further, the relationship between the distance $l$ of a film F from the exit pupil of the zooming lens group A and the distance $S''$ of the film F from the position of the image of the object is represented by the following formula.

$$S'' = l - S' = l + S/\gamma^2 \qquad (2)$$

The distance $\Delta x$ by which the focusing lens group B must be moved to maintain the constant resultance image position in a stationary image plate, i.e. on the film F, is represented by the following formula where the focal length of the focusing lens group B is $f$ and the distance between the principal points of the focusing lens group B is H.

$$\Delta x = (1/2) \{ (S'' - 2f - H) - \\ <(S''-2f-H)^2-4f^2 \} \ldots \qquad (3)$$

Figure 3:
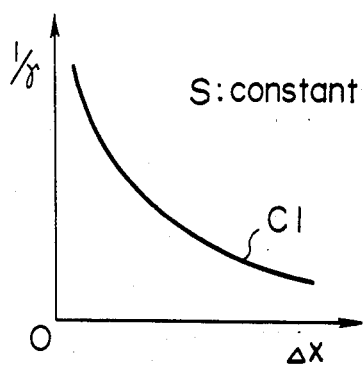
FIG. 3 is a graph showing the relationship between the afocal magnification of the zoom lens and the distance of movement of the focusing lens group thereof.
Figure 4:
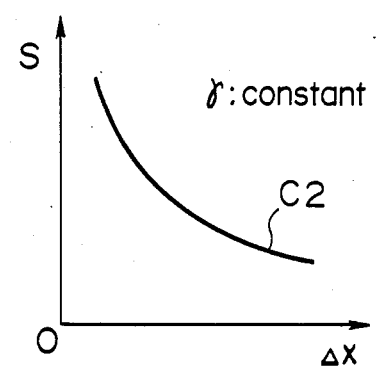
FIG. 4 is a graph showing the relationship between the distance of the object and the distance of movement of the focusing lens group of the zoom lens system.

Since $S'' = l + S/\gamma^2$, the distance $\Delta x$ by which the focusing lens group B must be axially moved is represented by curve-C1 as shown in FIG. 3 where the distance S is maintained constant and the afocal magnification $\gamma$ is varied. Further, the distance $\Delta x$ is represented by curve-C2 as shown in FIG. 4 where the afocal magnification $\gamma$ is maintained constant and the distance S is varied.

Accordingly, in order to maintain the resultant image position in a stationary image plane during the operation of zooming, the focusing lens group B is first moved by the distance $\Delta x$ in accordance with the formula (3), i.e. curve-C2, and when zooming, the focusing lens group B is moved in accordance with the formula (3), i.e. curve-C1, varying the afocal magnification $\gamma$.

FIGS. 5A and 5B show a preferred embodiment of the present invention employing a mechanical control means. Referring to FIG. 5A, a zooming movable lens group L1 is connected with a conversion means 10 which converts the distance of movement of the zooming movable lens group L1 to a distance indicative of $1/\gamma$. The conversion means 10 is connected with a gear 11 which is meshed with a toothed portion 12a of a three dimensional cam member 12 to move the latter up and down by the rotation thereof. The three dimensional cam member 12 has a three dimensional cam face 12b which has a contour representing said curve-C1 and curve-C2. The contour of the cam face 12b represents those curves when the coordinate system is taken as shown in FIG. 5B. In other words, the horizontal cross-section of the cam face 12b represents curve-C2 as shown in FIG. 4, and the vertical cross-section of the cam face 12b represents curve-C1 as shown in FIG. 3. The cam member 12 is provided with an operating rod 13 which extends in the direction parallel to the axis of said gear 11 and is moved lengthwise for focusing as described hereinbelow. The cam member 12 is engaged at the cam face 12b with a cam follower pin 14 which is connected with a focusing lens group L2 so that the latter is moved axially by moving the cam member 12 in the direction parallel to the axis of said gear 11 by means of said operating rod 13 in accordance with curve-C2. The cam follower pin 14 is movable only in the direction parallel to the optical axis of the lens system.

In operation of the zoom lens system associated with a mechanical control means as described above, the focusing lens group L2 is axially moved for focusing by moving the operating rod 13 lengthwise in accordance with the relation represented by curve-C2. Then, when the focal length is varied by axially moving the zooming movable lens group L1, the afocal magnification $\gamma$ thereof is transmitted to the cam member 12 through the conversion means 10 and the gear 11 and the cam member 12 is moved vertically to move the focusing lens group L2 in accordance with the relation represented by curve-C1. Thus, the focusing lens group L2 is moved in response to the movement of the zooming movable lens group L1 to maintain the resultant image position always in the stationary image plane.

Figure 6:
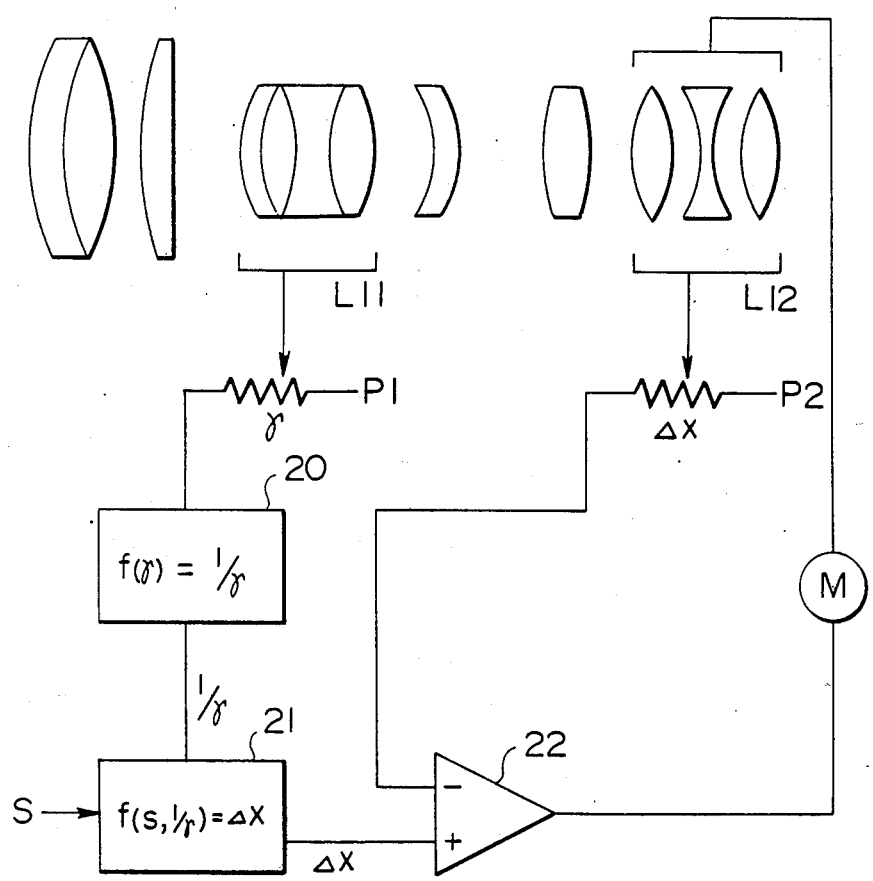
FIG. 6 is a diagram showing the zoom lens system with an electric circuit in accordance with another embodiment of the present invention.

FIG. 6 shows another embodiment of the present invention employing an electrical control means. Referring to FIG. 6, a zooming movable lens group L11 and a focusing lens group L12 are connected with potentiometers P1 and P2, respectively, to convert the distance of movement thereof to electric signals. The potentiometer P1 connected with the zooming movable lens group L11 represents the afocal magnification $\gamma$ and the potentiometer P2 represents the amount of movement $\Delta x$ of the focusing lens group L12. The output signal of the first potentiometer P1 representing the afocal magnification $\gamma$ is converted to a signal indicative of $1/\gamma$ by a signal converter 20. The output of the signal converter 20 is put into a calculating circuit 21 which receives the output indicative of $1/\gamma$ from the signal converter 20 and a signal indicative of the distance S of the object from the zoom lens system and gives an output representing the distance $\Delta x$ by which the focusing lens group L12 should be moved. The output of the calculating circuit 21 is put into a servo-amplifier 22. The output signal of the second potentiometer P2 representing the movement $\Delta x$ of the focusing lens group L12 is also put into the servo-amplifier 22. The output from the second potentiometer P2 is compared with the output from the calculating circuit 22 so that the servo-amplifier 22 will give an output for rotating a servomotor M to move the focusing lens group L12 when said two outputs are different from each other. Thus, the focusing lens group L12 is axially moved to maintain the resultant image position always in a stationary image plane. The calculation made by said calculating circuit 21 is in accordance with said formula (3).

In the above described embodiments of the invention, the light rays between the zooming movable lens group A and the focusing lens group B are parallel. However, even when the light rays are not parallel between the lens groups, a formula similar to said formula (3) can be obtained and the similar results can be effected by use of the formula.

I claim:

1. A zoom lens system comprising a zooming movable lens group (L1, L11) and a focusing lens group (L2, L12) wherein the focusing lens group (L2, L12) is axially moved to maintain the resultant image position in a stationary image plane when the zooming movable lens group (L1, L11) is axially moved for varying the focal length thereof, wherein the improvement comprising conversion means (10, P1, 20) for converting the distance of axial movement of the zooming movable lens group (L1, L11) to a value representing a reciprocal number of the afocal magnification $(1/\gamma)$ of the zoom lens system, calculating means (11, 12, 13; 21) which receives said value $(\gamma)$ and a signal representing the distance (S) of an object to be photographed from the zoom lens system and gives an output representing a distance $(\Delta x)$ by which the focusing lens group (L2, L12) should be axially moved to maintain the resultant image position in a stationary image plane, and connecting means (14; 22, M, P2) for connecting said calculating means (11, 12, 13; 21) with said focusing lens group (L2, L12) to move the focusing lens group (L2, L12) in accordance with the output $(\Delta x)$ from said calculating means (11, 12, 13; 21).

2. A zoom lens system as defined in claim 1 wherein said conversion means is a mechanical converting means (10) which transmits the movement of the zooming movable lens group (L1) in a form of a mechanical movement which represents the reciprocal number of the afocal magnification $(1/\gamma)$, said calculating means is a cam mechanism (11, 12, 13) which has a three dimensional cam face (12b) and is movable in one direction in accordance with said signal representing the distance (S) of an object to be photographed and in another direction perpendicular to said direction by said mechanical movement from said mechanical converting means (10) representing the reciprocal number of the afocal magnification (1/γ), and said connecting means is a cam follower (14) engaged with said cam face (12b) and connected with the focusing lens group (L2).

3. A zoom lens system as defined in Claim 2 wherein said cam mechanism (11, 12, 13) comprises a cam member (12) having said cam face (12b) and movable in a horizontal direction and a vertical direction, an operating portion (13) fixed to said cam member (12) for moving the latter in a horizontal direction, and a gear (11) meshed with a toothed portion (12a) of the cam member (12) for moving the latter in a vertical direction.

4. A zoom lens system as defined in Claim 1 wherein said conversion means is an electrical converting means (P1, 20) which detects the distance of movement of the zooming movable lens group (L11) and gives an output representing the reciprocal number of the afocal magnification (1/γ), said calculating means is a calculating circuit (21) which receives said output from said electrical converting means and an electric signal representing the distance (S) of an object to be photographed from the zoom lens system and gives an output representing said distance (Δx) by which the focusing lens group (L12) should be axially moved; and said connecting means comprises a servo-amplifier (22) receiving said output from the calculating circuit (21), a servomotor (M) driven by said servo-amplifier (22) for axially moving said focusing lens group (L12), and a potentiometer (P2) which detects the distance of movement of the focusing lens group (L12) and put the detected output into said servo-amplifier (22).

5. A zoom lens system as defined in claim 4 wherein said electrical converting means (P1, 20) comprises a potentiometer (P1) which detects the distance of movement of the zooming movable lens group (L11) and an electric signal converting circuit (20) which converts the output of the potentiometer (P1) to a reciprocal number of said output.

* * * * *